July 10, 1962 H. B. RIBLET 3,043,189
APPARATUS FOR PRODUCING TEMPLATE USED
IN AUTOMATIC DATA PLOTTER
Original Filed July 9, 1957 4 Sheets-Sheet 1
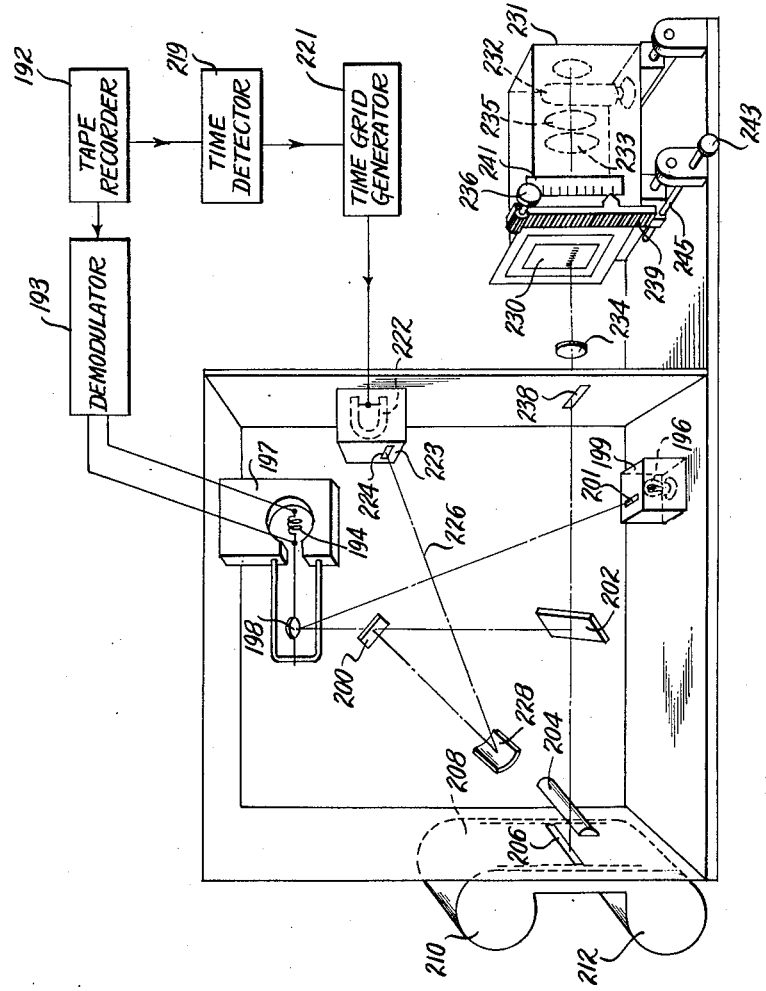
INVENTOR.
*Henry B. Riblet*
BY
*Abraham A. Saffitz*
ATTORNEY July 10, 1962 H. B. RIBLET 3,043,189
APPARATUS FOR PRODUCING TEMPLATE USED
IN AUTOMATIC DATA PLOTTER
Original Filed July 9, 1957 4 Sheets-Sheet 2
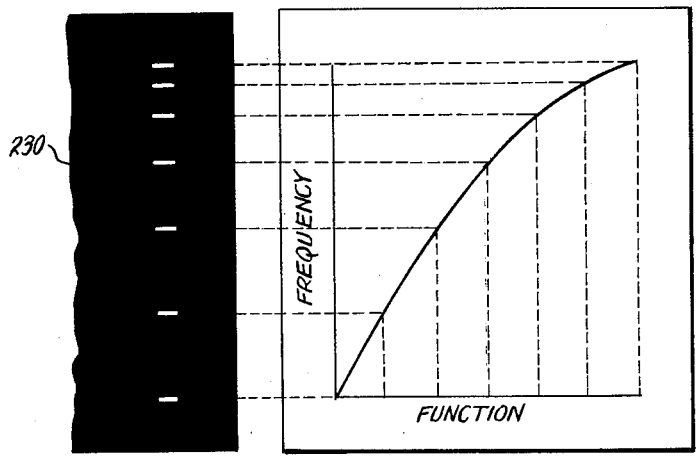
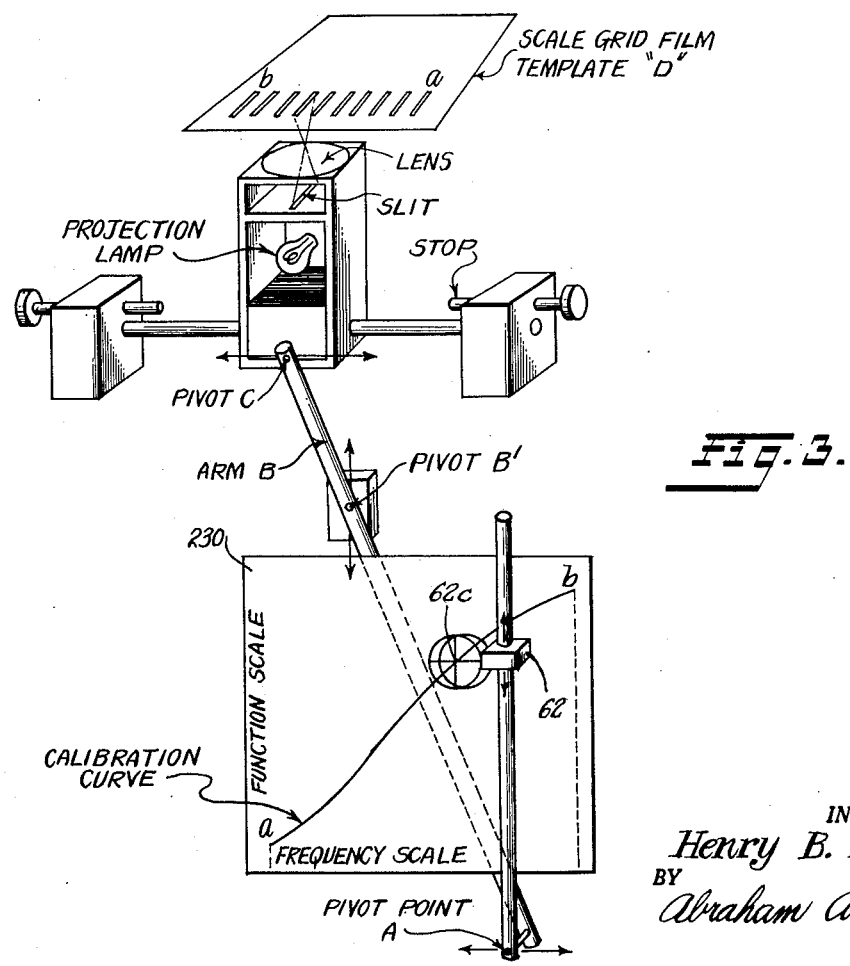
INVENTOR.
Henry B. Riblet
BY
Abraham A. Saffitz
ATTORNEY

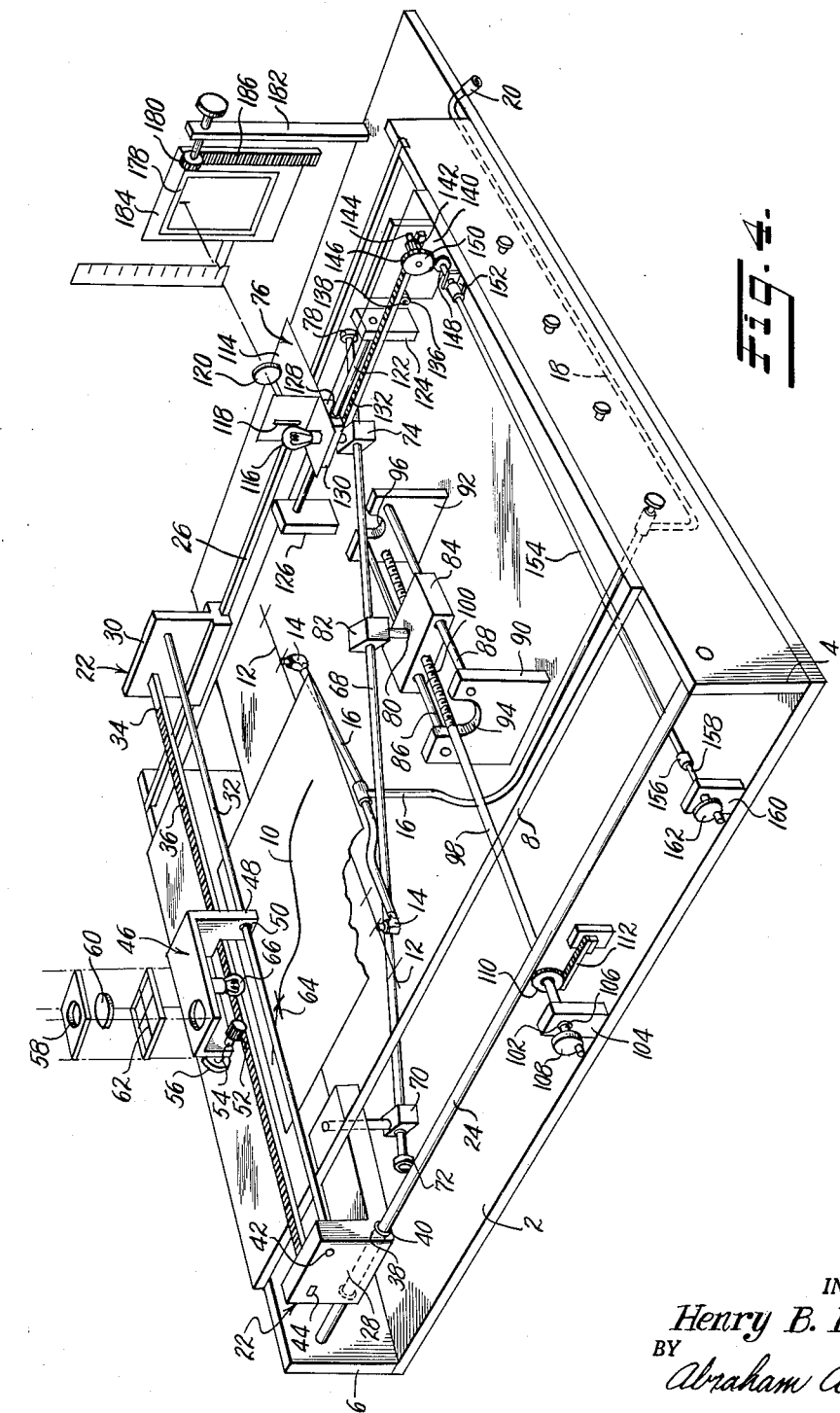

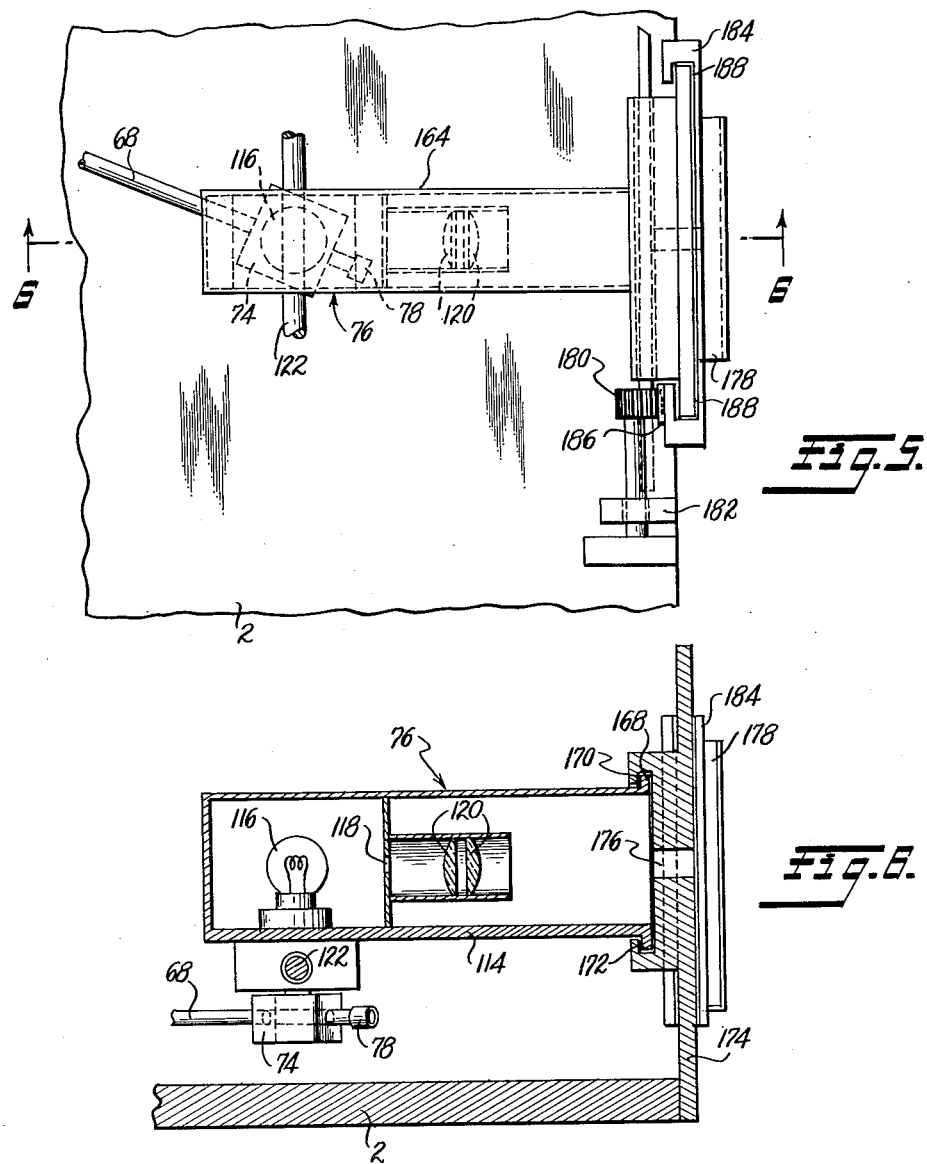

United States Patent Office 3,043,189
Patented July 10, 1962

3,043,189
APPARATUS FOR PRODUCING TEMPLATE USED IN AUTOMATIC DATA PLOTTER
Henry B. Riblet, Kensington, Md., assignor, by mesne assignments, to Vitro Corporation of America, New York, N.Y., a corporation of Delaware
Original application July 9, 1957, Ser. No. 670,691, now Patent No. 2,985,499, dated May 23, 1961. Divided and this application Dec. 27, 1960, Ser. No. 78,785
8 Claims. (Cl. 88—24)

The present invention is a division of my parent patent application Serial No. 670,691, filed July 9, 1957, now U.S. Patent No. 2,985,499, issued May 23, 1961, entitled "Automatic Data Plotter."

In the parent application there is described and claimed a system and apparatus for converting raw data into a usable form for visual presentation. More particularly, the invention of the parent application relates to a system and apparatus for automatically producing a data trace while at the same time marking the sheet upon which the trace is drawn with coordinates providing a true indication of the value of the function which is traced as well as the time at which the function was measured.

A record of information upon which function and time have been simultaneously recorded is employed to simultaneously actuate means for tracing the functions and means for producing vertical lines to indicate the real passage of time. Preferably, the means for tracing the function is calibrated so that the true horizontal position of various function levels is known and means are provided to produce horizontal lines indicating true function level simultaneously with the tracing of the function and the production of the time grid.

More particularly, in accordance with the invention, the data trace, the time grid and the function grid are produced by optical means and projected upon a photosensitive surface so that the data trace and the time and function grids are simultaneously formed to produce in a single and automatic operation a data trace upon a background of true horizontal and vertical coordinates.

In this manner, the arduous task of manually replotting the data trace to show true coordinates is eliminated.

The present divisional application is directed to apparatus for producing the function template which is used in accordance with the above defined system for producing the function grid.

The problem of converting raw data into a usable form for analysis has been one of long standing. Data recorders and plotters are of many types, and specific designs have been achieved to meet specific requirements. However, in most plotting and recording devices the printed grid has been a fixed nature and is usually linear or logarithmic. Since, in most cases, the plotting grid is not preprinted, some calibration technique must be applied to the plotted trace to determine the data values.

In the data plotting system and apparatus of the present invention, the function grids are produced simultaneously with the data trace, and may be made to conform with the transfer function of the system, whether linear or non-linear, and with the prescribed scale factor. Thus any arbitrary function may be plotted automatically without the requirement of linearity corrections in reading, provided the transfer characteristics are known beforehand.

Referring to data plotting systems, in general, the final goal of most data recording processes is to obtain a direct plot of function versus real time. If a continuous plot is required, as it frequently is, the first step is usually to record a trace on a moving strip of paper or film. The displacement of the trace from a fixed reference line, being related through some known transfer function to the data values, provides an indication of the magnitude of the function at all times.

The next step which is required in obtaining the final plot is to read the trace displacement at regular time intervals and convert the displacement by means of the transfer function to the data value. The final step is to replot the data as a function of real time, interpolating between timing marks recorded along with the data trace.

The recorders which may be used in the prior art fall generally into two classes—(1) There are the direct writing recorders which write directly on a paper chart either in ink or by means of a hot wire element; and (2) there are the photographic recorders which write on a photosensitive film or paper roll by means of a light beam.

Some of the features of these two classes of recorders are shown in Table I where they are compared to the system and apparatus of the present invention.

Table I

| Feature | Direct Writing Recorder | Photographic Recorder | System and Apparatus of the Invention |
|---|---|---|---|
| Printed Function Grid for Linear Functions. | Yes | No | Yes. |
| Printed Function Grid for Non-Linear Functions. | No | No | Yes. |
| Low Frequency Response (D.C. to 100 c.p.s.). | Yes | Yes | Yes. |
| High Frequency Response (100 to 1,000 c.p.s.). | No | Yes | Yes. |
| Printed Real Time Grid. | No | No | Yes. |
| Printed Arbitrary Time Grid. | Yes | Yes | Yes. |
| Direct Plot of Function Versus Real Time. | No | No | Yes. |

One advantage of the direct writing recorders is that, in the case of linear transfer functions, preprinted function grids may be employed, whereas these are not generally obtainable with photographic recorders. In the case of non-linear functions, neither type of recorder provides a function grid.

Both of these prior art types of recorders are excellent for applications involving only low intelligence frequencies, and here the direct writing recorder is frequently preferred since no film processing is required. For high frequency response, however, the inertia of the recording element becomes a limitation and the use of the photographic recorder is dictated.

Arbitrary time grids are available with both types of recorders. These may be preprinted in the case of the direct writing recorder or photographed along with the data in the case of the photographic recorder; however, in either case they do not directly represent real time such as field time in the case of a guided missile flight. This must be determined by interpolation between recorded time pulses.

Complex and time consuming operations have been required heretofore, to convert data traces into presentable absolute data form.

Typically a data trace was recorded on photographic film or paper with respect to a reference line photographed from a fixed galvanometer. Frequency calibration points obtained from a standard frequency calibrator were recorded at the beginning of the data. The trace displacement of each calibration point with respect to the reference line was measured in inches and this information was used to plot a curve of displacement versus frequency.

The calibration of the transducer, a plot of frequency versus function, was combined with the frequency displacement calibration to obtain a curve of displacement versus function. The information contained on the function versus displacement calibration curve was used to construct a function scale card. This card was used to read the data trace directly in function value with respect to the reference line. This data reading was done manually point by point at discrete time intervals. The readings were tabulated and subsequently plotted as a final graph of function versus time. This complex system of reading data recorded from the FM/FM telemetering system is laborious and time consuming, generally taking several persons in the order of a week to complete the plotting of data obtained on one missile flight test.

For the reasons shown, some manual processing is invariably required in preparing the desired final plot of function versus real time. The system and apparatus of the invention combines the good features of both types of prior recorders and permits direct automatic plotting of the function versus real time without the necessity for manual reading and replotting. It will handle equally well linear and non-linear functions, low and high frequency intelligence, and will plot against either real or arbitrary time.

The invention will now be more fully described with reference to the accompanying drawings which illustrate a preferred form of the invention and in which:

FIG. 1 is a schematic view illustrating the recorder shown and claimed in copending application Serial No. 670,691 which also optically superposes the function trace, the function grid and the time grid upon a traveling strip of photographic film;

FIG. 2 illustrates a calibration curve and demonstrates the principle upon which the function scale grid template is produced;

FIG. 3 is a schematic view illustrating the apparatus and method of the present invention which is employed to produce the function scale grid template for use with the recorder of FIG. 1 and for producing the function grid;

FIG. 4 is a perspective view of the pantograph of the invention showing means for utilizing the frequency versus function graph of FIG. 2 in the production of a template in accordance with the procedure diagrammatically depicted in FIG. 3;

FIG. 5 is a plan view on an enlarged scale showing the details of the mounting of the lens carriage on the pantograph shown in FIG. 4;

FIG. 6 is a cross section taken on the line 6—6 of FIG. 5.

In the system of the parent patent application Serial No. 670,691, a frequency discriminator and calibrator together with an optical galvanometer are supplemented with a scale grid projector and a time grid strobe flash tube. The scale grid template is constructed directly from the frequency versus function calibration curve by being photographed continuously along with the data trace making it unnecessary to tabulate and replot the data. This may be done in the case for an FM/FM telemetering system or similar system, for example, where frequency is one type of unit. Obviously other units may be handled in similar fashion, for example, voltage. The time grid is also photographed simultaneously and can be synchronized with the real field time values.

The calibration procedure for this data plotting system requires inserting particular frequencies corresponding to specific function values as read from the function versus frequency calibration curve. These specific frequencies are inserted into the system from the frequency calibrator. By special assignment of electrical values, the function grid may be made to correspond to any transfer characteristic desired and this system has the advantage of maintaining a high frequency response of better than 1000 c.p.s. by use of the optical writing system in comparison with the slow systems of the prior art. Note further that the prior art photographic system usually has no function grid lines at all.

Thus the automatic data plotting system of the invention comprises three main components—(1) the galvanometer recorder, (2) the time grid generator and (3) the function scale grid recorder. The galvanometer recorder utilizes a standard unit which has been modified to provide the necessary optical elements for the superimposition of the function scale grid, the time grid, and the data trace. The standard optical lever arm of approximately 30 centimeters has been preserved. The timing system comprises a gas discharge strobe tube which is triggered from a pulse-generating circuit which is directly actuated by the timing pulses which are recorded with the data or intelligence.

This then provides an optical system for the superimposition of three images: One from the galvanometer mirror; one from the scale grid template; and one from the strobe flash tube which generates the time grid. As the film is driven past the exposure window, the function grid lines are photographed as horizontal lines for the full length of the record; the time grid is photographed as vertical lines sequentially along the record; and the galvanometer produces a continuous data trace on this grid system.

FIG. 1 is a diagram of the system described above in which the blocks at the top of the diagram indicate a source of data which in this case originates from telemetering data stored on magnetic tape recorder. A suitable demodulator comprising a system of subcarrier discriminators and low pass filters is necessary for conversion of the FM data recorded on the magnetic tape into an electrical current for stimulating the magnetic galvanometer. The timing pulses which are also recorded on the magnetic tape are detected by conventional means and processed by the time grid generator 221.

FIG. 1 also shows the optical paths for the galvanometer trace, the function scale grid, and the time grid. The galvanometer light source consists of any suitable source of light such as an incandescent line filament which is projected onto the galvanometer mirror, thence to the half-silvered mirror directly under the collimator lens and film plane.

The function scale grid film or template consists of an opaque film or punched card with transparent slits which represent the scale grid lines to be photographed on the film. The image of this template is projected by a standard optical projection lens through a half-silvered mirror and the collimator lens directly onto the film plane. The strobe flash tube which generates the time grid is contained in a light seal with a slit window. The image is projected onto the film plane in a path parallel to and coincident with the optical path from the galvonometer mirror.

In FIG. 1, the data source 192 may be a transducer suitable for converting physical quantities into voltage or electrical currents including suitable modulating devices for storage on magnetic tape. This data in stored form may be played back again providing data in the form of volts or an electrical current representing the original function. The data may be fed directly to the data plotter of the present invention if desired. When the variable function is to be plotted with respect to time, suitable timing markers may be included on the tape storage or provided by a standard source. The latter are usually put on the data storage medium at regular intervals by suitable modulating apparatus. Recorded signals are applied through demodulating apparatus 193 to the coil 194 of a mirror galvanometer element 198 of a known type mounted in a magnetic block 197. Electric lamp 196 is mounted in a light shield 199 with a slit window 201 as the light source providing light beams for the galvanometer and is arranged so that the light rays in the beam fall onto the galvanometer mirror 198. The rays are reflected by the galvanometer mirror 198 through a first half-silvered mirror 200, having approximately 50% transmission and 50% reflection characteristics, and fall onto a second half-silvered mirror 202. Part of the light ray is reflected by the mirror 202 through a suitable imaging lens 204 and through a slit 206 onto a strip of film 208. The film 208 is fed from a magazine 210 to a take-up magazine 212 by a suitable motor drive (not shown).

Also supplied to the data plotter are the timing pulses. These are fed through a suitable demodulating device or time pulse detector 219 to the time grid generator 221, which flashes the flash tube 222 mounted in a light-tight box 223. A narrow slit 224 is provided in the box 223 thereby providing a narrow light beam 226. The timing line light beam 226 falls onto a full-silvered lens mirror 228 and is reflected onto a partially-silvered mirror 200 from which it is reflected to fall onto another half-silvered mirror 202 where it becomes coincident with the galvanometer light beam to eventually pass through a collimator lens 204 and slit 206 onto the film 208.

The scale grid 230 shown in detail in FIG. 2 is also projected onto the film 208. This is accomplished without interfering with the optical systems described hereinbefore. The scale grid film or templet 230 is suitably mounted in the scale grid projector 231 and a projection light source 232 is provided for illumination of the scale grid templet. The light rays from the projection lamp 232 are focused into parallel light beams by condensing lens 233 and 235 and those light beams passed by the scale grid film or templet 230 are focused by projection lens 234 and pass through a window 238 and the half-silvered mirror 202, imaging lens 204, slit 206, and onto the film 208.

The scale grid templet 230 is mounted in a movable holder which is adjustable in a vertical position by the rotation of knurled knob 236 which turns a pinion gear whose teeth engage in the teeth of rack 239. The movable holder is provided with detents to engage the holder in specific positions indicated by the marks on the indicator scale 241. This vertical movement allows the operator to project the proper scale grid relating to the function whose recording is desired. There may be as many as ten (10) such scales on one templet.

The entire scale grid projector assembly can be moved laterally in a horizontal plane by turning knob 243 which rotates a lead screw 245. Lead screw 245 is engaged in screw threads attached to the mounting plate of the projector assembly thereby providing the horizontal positioning of the scale grid templet, while keeping proper optical alignment. The horizontal movement is provided to give an adjustment of the projected image of the scale grid on film 208 with respect to the galvanometer spot image. A function zero adjustment can be accomplished by this means.

The time grid generator 221 for triggering the strobe flash tube 222 consists of two zero-to-ten preset scalers in series whose outputs trigger thyratrons which are used for controlling the timing strobe flash tube. The two thyratron trigger circuits are arranged to produce a major and minor grid system by controlling the intensity of the strobe flash tube at the proper time. The output of the first scaler is used to trigger a thyratron which controls the flash tube through a current-limiting resistor, thus decreasing its intensity with respect to its maximum capacity. The output of the second scaler is fed to a thyratron which fires a gas discharge tube in shunt with the current-limiting resistor.

Thus when the second thyratron is fired and the current-limiting resistor is shorted out, the intensity of the flash of the strobe tube will increase, producing a major grid line. The two zero-to-ten scalers may be preset to a particular count, thus generating any desired relationship between major and minor divisions. In addition, the scalers give a control count with respect to the original timing pulses.

The zero-to-ten preset scalers in series in time grid generator 221 may include a pulse counter which is set for counting the integers from 1 to 10. Thus, for one operating condition the counter may provide 1 output pulse for each input pulse; for another it will provide 1 output pulse for two input pulses and so forth.

Each scaler group used in the system of the invention has an input driver stage to insure sufficient trigger amplitude and rise time and a Schmitt trigger and dual cathode follower plug-in stage is employed to couple from one scaler to the other. This provides a uniform pulse shape and amplitude as well as a low impedance driving source.

The cathode follower is a dual stage and one half is also used to drive the thyratron trigger circuit. Inputs are provided to drive each scaler separately or in series from positive going pulses. Additional input jacks are provided to drive the thyratron trigger circuits independently by either a positive or a negative going pulse. This flexibility is provided to permit use with a variety of field time trigger pulses, both positive or negative with or without scaling.

A power supply is provided to furnish the ionizing voltage for the strobe flash tube used for photographing the timing lines. The scaling circuits and thyratron triggers will work up to about 100 pulses per second.

By adjusting the preset scaler to proper current values, major and minor time grids are produced in a definite ratio of major to minor time lines by brilliant or less brilliant flashes of tube 222.

FIG. 2 illustrates the factors which are taken into account in constructing the template 230. At the right hand side of the figure there is shown a graph of frequency against function. As previously indicated, predetermined frequencies corresponding with preselected function values are recorded on the magnetic tape and these are played into the demodulator 193 and thence into the galvanometer to produce lines on the film 208. The distance between the lines and the reference line on the film 208 represents the value of the function and these values can then be plotted against the known frequencies to produce a line or curve. If the line is straight, the function is linear. Frequently, the line is a curve and the function is not linear.

Evenly spaced lines (the vertical dotted lines) are now drawn to their intersection with the curve and lines are drawn (the horizontal dotted lines) from the said intersections and transparent areas are formed in an opaque template at the level of the horizontal lines. If desired, the spaces between the vertical lines can be broken down to result in further horizontal lines as indicated by the dash dot lines to produce intermediate markings designated by a thinner transparent area on the template.

FIG. 3 shows a schematic diagram of the optical-mechanical pantograph which is the subject matter of the claims of the present invention and which provides function scale grid templets 230 for the data plotting apparatus of the invention. This diagram shows in simplified form the mechanical connection between the cross hair cursor and the lens assembly for photographing a slit image on the film plane.

The mechanical arm B is pivoted at point B' in a manner to allow the cross hair cursor to travel from one end of the calibration curve to the other and the lens assembly to travel between mechanical stops. The pivot point B' is adjustable to accommodate a variety of dimensions in calibration curves. In the operation of the pantograph the cross hair cursor is centered upon predetermined intersections of function values and frequency, and at each intersection the stroke tube which illuminates the slit image is energized, thus photographing a line on the photographic film located at D.

The completed function scale grid templet has a series of closely spaced lines photographed on the film which represent the function values desired. The incremental spacing of these function grid lines is proportional to the curvature of the calibration curve.

In more detail and referring to FIG. 4, it can be seen that the pantograph of this invention comprises a base plate 2 on opposite sides of which a pair of laterally spaced side plates 4 and 6 are mounted. A transparent plate 8 of glass or suitable plastic is attached to the uppermost edges of the side plates 4 and 6. The graph paper on which a calibration curve 10 has been plotted is laid on the flat plate 8. To hold the paper firmly on the plate 8, a number of grooves 12 have been provided on the upper surface thereof and suitable connections 14 are carried on the under surface of the plate for vacuum lines, one of which is shown at 16, which communicate with said grooves. Other vacuum lines (not shown) individually communicate with the other grooves depending upon the size of the curve paper. Valves are mounted on the side plates in each vacuum line between a manifold 18 and the outlet connection 20 so that the vacuum is applied only to the required grooves.

A carriage generally indicated by the reference numeral 22 is mounted for motion laterally between the side plates 4 and 6. For supporting one end of the carriage assembly, a single fixed rail 24 is provided at the outer end of the pantograph, extending between the side plates 4 and 6. The other end of the carriage assembly is supported by similar fixed rail 26 which extends between the side plates 4 and 6.

The carriage assembly 22 comprises outer and inner end members 28 and 30, respectively, which are interconnected by a rod 32 and rack 34 having teeth 36. The outer end member 28 is a block having an aperture 38 for receiving a ball bushing type bearing 40 which slidably receives the rod 24. The block 28 is also provided with a hole 42 for receiving the outer end of rod 32 and a hole 44 for receiving rack 34.

The inner member comprises a block 30 and has a bushing similar to 40 for a sliding contact with rod 26. The block 30 is also provided with an aperture for receiving an end of rod 32 and an aperture which accommodates the end of the rack 34.

A second carriage 46 is mounted for sliding motion along the rods 32 and 34 interconnecting the end members. This carriage also comprises a block 48 having an aperture in which a ball bushing bearing 50 is mounted for slidingly receiving the rod 32. A gear 52 is provided in block 48 for engaging the rack 34. The gear 52 having teeth in engagement with the rack teeth is carried on the inner end of a shaft 54 journaled in the block 48 and turned by a knob 56. The block 48 also includes a sighting hole 58 in which a suitable lens 60 and cross hairs 62c on the cross hair mounting 62 are provided for sighting the desired point 64 on the calibration curve 10. A light bulb 66 is mounted on block 48 to illuminate the calibration curve if necessary.

For moving the carriage 22 laterally an arm 68 is provided having one end slidably carried in a bearing mounted in an aperture in block 70 which is pivotally attached to the underside of block 28. A stop 72 is provided at the end of arm 68. The other end portion of arm 68 is similarly received in a bearing mounted in a block 74 pivotally attached to the underside of a lens carriage generally indicated by reference numeral 76. A stop 78 is also provided at this end of the arm. A pivot point 80 for the arm 68 is provided intermediate to its ends. At this point, the arm 68 is slidably received in a bearing mounted in an aperture in a block 82 which is pivotally mounted in a block 84. So that the pivot point of the mechanism can be adjusted, the block 84 is slidably carried on a pair of spaced rails 86 and 88, the ends of which are received in suitable apertures provided in a pair of spaced mounting plates 90 and 92. Cutout portions 94 and 96 are provided in the plates 90 and 92 respectively allowing the passage of a lead screw 98 having a threaded portion received in a threaded aperture 100 in the block 84. The lead screw is rotatably mounted in a bearing 102 provided in a block 104 at the outer edge of the plate 2. Lead screw 98 has a reduced end portion 106 on which a knob 108 is fixed. A gear 110 is fixed on the lead screw 98 which engages a spring loaded rack 112 which pivots to disengage the gear. When the rack 112 is engaged in gear 110, the lead screw 98 is locked to prevent rotation and subsequent movement of pivot point 80.

The lens carriage 76 comprises plate 114, on which is mounted a strobe-flash illumination source 116, a slit 118, and a lens 120. The lens carriage is slidably mounted on a rod 122 which has its ends received in suitable mounting plates 124 and 126, the rod itself being received in a bearing 128 carried in a block 130 attached to underside of plate 114 of the lens carriage 76.

For moving the lens carriage laterally, a rack 132 is provided having one end attached to a bifurcated bracket 134 on block 130. The other end of rack 132 is slidably supported on a flanged wheel 136 which is rotatably mounted on a shaft 138 journaled in a bracket 140. The teeth of rack 132 are arranged to mesh with the teeth of a pinion gear 142 attached to one end of a shaft 144 also journaled in the mounting bracket 140. The other end of shaft 144 carries a large gear 146 which meshes with a small gear 148 carried on a shaft 150 journaled in mounting bracket 152. A universal connection is provided between shaft 150 and an end of shaft 154 which has its other end coupled by a universal 156 to a shaft 158 journaled in a bracket 160. The outer end of the last-named shaft is provided with a knob 162. It can be seen that turning knob 162 will move the lens carriage 76 laterally and will also, because of the arm 68, move the carriage 22.

Shown in detail in FIGS. 5 and 6 is the light-tight housing 164 for the strobe-flash tube 116, an adjustable projection lens 120, and an aperture or slit 118, is mounted on the lens carriage 114. The forward plate 168 has its upper and lower edges received in grooves 170 and 172 attached to a mounting plate 174 fastened to an edge of base plate 2. The mounting plate has an opening 176 aligned with the aperture in housing 164.

A vertically adjustable film holder assembly is also mounted on the plate 174. A knurled shaft 180 is rotatably mounted in a bracket 182 fastened to base plate 2. The mounting plate 174 also has a pair of spaced guideways attached thereto which slidably receive a frame 184 to which a film holder 178 of a well known type can be fastened. A rack 186 engaging knurled shaft 180 is provided on the plate 174 so that the frame 184 can be adjusted vertically. Strips of felt 188 are attached to the frame 184 to prevent extraneous light from exposing the film in the film holder 178.

In operation a typical instrument calibration curve such as, for example, a non-linear curve similar to that shown in FIG. 2 in which a function such as volts is plotted against frequency, is placed on the plate 8 and held in position by a vacuum applied thereto. The pivot 80 is then adjusted to set the proper scale to enable the carriage 22 to move from one end of the curve to the other, while the lens carriage moves between brackets 124 and 126 which also act as mechanical stops. A piece of unexposed photographic film is inserted in the film holder 178. The carriages 22 and 46 are then moved along their respective supporting rails, corresponding to the abscissa and ordinate directions on the curve paper such that the cross hair cursor intersects the curve at the desired points. The strobe-flash bulb 116 is then energized to expose the film at desired points thereby representing the function value.

The completed function scale grid templet has a series of closely spaced lines photographed on the film which represent the function values desired. The incremental spacing of these function grid lines is proportional to the curvature of the calibration curve.

Calibration procedures are now described.

Since the incremental spacing of the function grid lines has been made to conform with the transfer characteristic of the system, a voltage or current analog, which is the driving force for the galvanometer, may be used to calibrate the data plotter.

As indicated previously, the function value for approximately 3 points distributed along the calibration curve can be determined for specific values of the carrier system. These values should be determined from the calibration curve of the transfer characteristic for the system. This current or voltage analog may then be fed to the galvanometer element in the recorder directly.

In the case of a frequency modulated carrier system the frequency analog may be fed through the frequency discriminator which drives the galvanometer. At this time the sensitivity and zero of the galvanometer element is adjusted so that the trade displacement conforms with the correct function value on the projected image of the function scale grid templet. This voltage or current analog may also be injected into the system at any other convenient point.

To give a detailed example, the calibration procedure used in plotting data from an FM/FM telemetering system will be described. In the FM/FM telemetering system the function values are transmitted by a frequency-modulated subcarrier. In other words, the function amplitude is proportional to the frequency of the carrier transmitted.

A calibration curve is plotted giving the function to be measured as one coordinate and the frequency as the other coordinate. This calibration curve can include a combination of the transfer characteristics of all of the components in the system. In the particular system being described, the transmitted data is stored on a magnetic tape as the subcarrier frequency. Therefore, the instantaneous frequency at any given time represents a particular function value.

During the calibration procedures, a specific frequency is recorded onto the calibration tape. Two or three different values of frequency may be used to give a two or three-point calibration. Each calibrating frequency can be related to a specific function from the calibration curve; therefore the calibration point becomes a frequency analog of the function value to be calibrated.

In the case of a voltage controlled frequency-modulated subcarrier oscillator, this calibration frequency can be considered as an analog of the input voltage, and again related to a specific function in cases where the transducer output is a voltage. These calibration frequencies are then played back from the magnetic tape storage through the playback demodulation equipment which is connected to the recording galvanometer.

The calibration points are of sufficient length to allow adequate time for the sensitivity and zero adjustments. During this time the operator simply adjusts the sensitivity of this recording amplifier and makes the zero adjustments necessary to cause the calibration points to fall on the projected image of the function scale grid at points which correspond to the function values of the frequency or voltage analog. This calibration adjustment can be made under normal circumstances in about five minutes. For other data systems than specifically illustrated a similar calibration procedure can be worked out.

The operation of the calibration curve pantograph is simple and straightforward. The calibration curves are prepared on a standard 8½ x 11 or 10 x 15 inch graph paper. Ozalid copies of original curves may also be used. The function values to be transferred to the calibration curve templet are determined and indicated on the curve in order that they can be easily recognized under the cross hair cursor.

The ratio between major and minor divisions is decided upon and programmed onto the counting circuits and the center line between the extreme ends of the calibration curve is marked to enable accurate placement of the curve on the plotting table. The operator then checks to see that the cross hair cursor will traverse the curve from one end to the other accurately while the lens assembly moves from one mechanical stop to the other. After the film has been loaded into the camera, the operator simply starts at one end of the calibration curve and intersects each function point to be transferred to the film.

At each point the flash strobe tube is energized to photograph the function grid line at this point. As indicated in the description of the pantograph, as many as 10 functions may be placed on one film. In such cases an adequate identification system must be used.

One simple method is to identify the film itself and also identify the number of the function grid position with the particular function used in the calibration curve. The detent positions in the film holder are numbered for this purpose.

One system of identifying the film itself for a particular group of functions has been worked out involving the use of a standard ink pen with permanent ink such as India ink, but obviously any other film marking (typewriter, stencil, etc.) may be used. In the dark room the title is written directly on the emulsion side of the film with India ink. The area immediately around the writing is then exposed to a small amount of light. This identification is done prior to its insertion in the film holder. During the subsequent photographic processing the ink washes off leaving its image in the silver emulsion. After the film has been exposed in the calibration curve pantograph, the film is processed in a photographic reversal bath to obtain an opaque background with transparent grid lines.

It is obvious that if standard processing techniques were to be used a negative would be obtained rather than a positive and this negative would have a transparent background with opaque grid lines. In such a case a contact print would be required on another film to obtain a projection image.

The errors involved in producing the scale grid template with the calibration curve pantograph, which have been determined by evaluation, can be divided into two classes—(1) Those errors due to the human operator; and (2) the errors involved in the mechanical optical system.

One method for evaluating these errors consisted of transferring onto the scale grid template the equivalent grid lines which were obtained from a precision drawing representing the calibration curve and these grid lines on the precision drawing were equally spaced representing a linear curve. These grid lines were transferred to the calibration curve template film by moving the cross hair cursor in one direction only.

When the curve had been completely traced in one direction, the film was displaced slightly in a vertical plane and the scale grid divisions were again transferred to the film moving the cross hair cursor in the opposite direction. This procedure was followed to determine the amount of backlash error in the mechanical system.

After photographic processing, the film was inspected under a traveling microscope and the incremental spacing between each scale division was determined to the nearest ten-thousandth of an inch. The individual incremental error was tabulated together with the accumulative error. It was found that these errors average only about 0.1% with a maximum error of about 0.2% of full scale value.

Since the errors involved in this evaluation were extremely small it is extremely difficult to separate the errors incurred by the human operator and those produced by the machine and no effort was made to separate the human error increment. Nevertheless, with proper training in the use of this instrument, the errors can be kept to the minimum as described above.

Errors in the optical projection system of the recorder were determined by comparing the photographed image of the calibration scale grid template with that of the original and in this case the optical produced by lens aberrations and other optical distortion was found to be negligible.

Accordingly, with normal care of adjustment during the calibration procedure described above, the calibration setup can be obtained with errors not exceeding 0.5%. Each individual point can be adjusted to even greater accuracy considering the full scale displacement of 4 inches.

This full scale value, 0.25% represents approximately one-hundredth of an inch displacement which is about the limit of resolution with respect to the width of the images of the scale grid lines and the galvanometer trace. Small errors in linearity of the galvanometer element itself and the recording amplifiers will limit the overall adjustment to an accuracy of approximately 0.75%. Thus if one excludes the errors of the calibration signal itself, the data can be plotted on this device with overall errors of less than 1%.

It is desired to state that various structural modifications may be made of the invention which has been presented in its present preferred form illustratively without departing from the spirit of the invention. For example, although spherical lenses have been shown, cylindrical lenses may serve the same purpose. The function grid template has been shown as a film although it could well assume other forms, e.g. a card with punched holes. The function grid has been shown as projected upon the same transverse area upon which the other information is recorded. This is preferred, but not essential. Only a single galvanometer is shown. Several galvanometers may be used when the recording contains several independent recordings of separate items of intelligence. In this was a plurality of unrelated or related data tracer may be traced.

Other mechanical means may be used for transferring the calibration information onto the film or punched card; for instance tabular information may be used instead of graphical information. In this case a scale for setting the tabulated displacement can be used in conjunction with a lead screw and movable optical system or card punch, in much the same manner as described in the pantograph. In this case only one dimension of movement is needed as opposed to the two dimensional system for a graphical transfer.

I claim:

1. Apparatus for producing an opaque photographed calibrated template having transparent closely spaced grid lines which are incrementally spaced apart in proportion to a calibration curve of a function with a measuring unit, said lines representing true values of said function with said measuring unit by said spacing and said template adapted to serve as a screen for projecting a light image of absolute grid lines in superposed relation over a data light trace of the said function from a light-trace readout device to thereby calibrate the data light-trace readout from said device against absolute values of said measuring unit represented by the grid lines, said apparatus comprising, a frame including a generally flat base plate, opposed vertical side plates and opposed end rails elevated above the base which are attached to said side plates, means to support a calibration curve which provides absolute values of data function with said measuring unit, a calibration-curve viewing carriage means mounted for both lateral movement on said end rails and for transverse movement between said end rails which is fitted with a cross hair viewer positionable over the calibration curve to precisely fix the position of said viewing carriage means with respect to a point on the calibration curve, a movable projection unit including a lamp, a slit defining member, lens and carriage mount for projecting lines of light through said slit on a photographic film with the spacing of said lines on said film being determined by the position of said cross hair viewer over said calibration curve to provide by said light projection spaced apart grid lines, a pantograph rod slidably connecting at one end the carriage means for viewing said calibration curve and slidably connecting at the other end to said movable projection means, adjustable pivot means intermediate said connected ends of said pantograph arm for smooth movement of said cross hair viewer along said calibration curve with precisely adjusted positioning of said means resulting thereby, and a film supporting means spaced from said projection means for holding the film exposed through said slit to make said template.

2. Apparatus as claimed in claim 1 wherein said supporting means for said graph is a transparent plate resting on said side plates.

3. Apparatus as claimed in claim 1 wherein said projection means is mounted for side to side movement parallel to the plane of said film supporting means.

4. Apparatus as claimed in claim 1 wherein said pivot means is mounted on a block which is slidably carried in a direction parallel to the transverse movement of said cross hair viewer.

5. Apparatus as claimed in claim 1 wherein said mounting block for said pivot means is slidably carried on a pair of spaced rails and said block is further provided with a threaded rod for fixing the transverse movement of said pivot means.

6. Apparatus as claimed in claim 1 wherein said lamp is a strobe-flash illumination source.

7. Apparatus as claimed in claim 1 wherein said carriage for said cross hair viewing means comprises a transverse rack member and a rail.

8. Apparatus as claimed in claim 1 wherein said carriage for said lens-projecting means comprises a transverse rack member and a rail.

References Cited in the file of this patent
UNITED STATES PATENTS
2,733,510     Darago _____ Feb. 7, 1956